US008023819B2

(12) United States Patent  
Jensen (10) Patent No.: US 8,023,819 B2
(45) Date of Patent: Sep. 20, 2011

(54) METHOD AND APPARATUS FOR NETWORK FAULT DETECTION AND PROTECTION SWITCHING USING OPTICAL SWITCHES WITH INTEGRATED POWER DETECTORS

(75) Inventor: Richard A. Jensen, Lexington, MA (US)

(73) Assignee: Polatis Photonics, Inc., Andover, MA (US)

( * ) Notice: Subject to any disclaimer, the term of this patent is extended or adjusted under 35 U.S.C. 154(b) by 819 days.

(21) Appl. No.: 12/004,455

(22) Filed: Dec. 20, 2007

(65) Prior Publication Data

US 2008/0175587 A1    Jul. 24, 2008

Related U.S. Application Data

(60) Provisional application No. 60/876,348, filed on Dec. 20, 2006.

(51) Int. Cl.
*H04J 14/00* (2006.01)
*H04B 10/08* (2006.01)

(52) U.S. Cl. ........................................... 398/56; 398/19
(58) Field of Classification Search .................... 398/19, 398/55–57
See application file for complete search history.

(56) References Cited

U.S. PATENT DOCUMENTS

| 6,532,089 | B1 | 3/2003 | Asahi | |
|---|---|---|---|---|
| 6,597,826 | B1 | 7/2003 | Ramaswami et al. | |
| 7,187,862 | B2 * | 3/2007 | Mahlab | ............ 398/10 |
| 2002/0071627 | A1 | 6/2002 | Smith et al. | |
| 2002/0093712 | A1 * | 7/2002 | Fukashiro et al. | ............ 359/128 |
| 2004/0208506 | A1 * | 10/2004 | Kinoshita et al. | ................ 398/19 |
| 2005/0180316 | A1 | 8/2005 | Chan | |
| 2007/0292130 | A1 * | 12/2007 | Pegg et al. | ....................... 398/20 |

FOREIGN PATENT DOCUMENTS

| CA | 2 673 252 | 7/2008 |
|---|---|---|
| CN | 101669317 A | 3/2010 |
| EP | 2127185 A1 | 12/2009 |
| WO | WO 00/60772 | 10/2000 |
| WO | WO 2007/143169 A2 | 12/2007 |
| WO | WO 2008/079392 A1 | 7/2008 |

OTHER PUBLICATIONS

Notification Concerning Transmittal of International Preliminary Report on Patentability (Chapter I of the Patent Cooperation Treaty) for PCT/US2007/026283, 9 pages, mailed on Jul. 2, 2009.

* cited by examiner

*Primary Examiner* — Nathan Curs (74) *Attorney, Agent, or Firm* — Hamilton, Brook, Smith & Reynolds, P.C.

(57) ABSTRACT

Current network switching architectures require communication with a higher level network control plane, which can be slow to reroute communications, resulting in unacceptable losses of communications for customers. Examples embodiments of the present invention reroute communications faster detecting optical power of an optical signal at optical switches coupled via optical communication paths, and causing at least one optical communication path between a first optical switch and second optical switch to switch to an alternative optical communication path, in part, through physical layer triggering in an event optical power at at least one of the first or second optical switches falls below a threshold level. Switching in response to physical layer triggering may result in reduced switching times and, consequently, faster restoration of communications to customers after a network fault interruption.

11 Claims, 13 Drawing Sheets

FIG. 11

METHOD AND APPARATUS FOR NETWORK FAULT DETECTION AND PROTECTION SWITCHING USING OPTICAL SWITCHES WITH INTEGRATED POWER DETECTORS

RELATED APPLICATION(S)

This application claims the benefit of U.S. Provisional Application No. 60/876,348, filed on Dec. 20, 2006. The entire teachings of the above application is incorporated herein by reference.

BACKGROUND OF THE INVENTION

Fiber cuts, equipment faults and degradations cause a significant number of disruptions and outages. Often, fault recovery times are slow as the network components (e.g., switches and network administrators) communicate to switch around equipment failures. As businesses and consumers become increasingly intolerant of network failures, downtime can be very expensive to carriers due to both lost revenue and tarnished reputations. As a result, carriers continually search for better ways to protect networks against such fiber faults and reduce costs by more efficient use of protection bandwidth.

SUMMARY OF THE INVENTION

An example embodiment of the present invention is a method, and corresponding apparatus, for switching optical communications paths by detecting optical power of an optical signal at optical switches coupled via optical communications paths. The example embodiment further includes causing at least one optical communications path between a first optical switch and second optical switch to switch to an alternative optical communications path, in part, through physical layer triggering in an event optical power at at least one of the first or second optical switches falls below a threshold level. Switches autonomously switching in response to a physical layer trigger results in reduced network fault recovery times.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Integrating fault detection into optical switching at the physical layer can greatly increase the speed of protection switching. Existing protection switching systems usually involves higher level communications or signaling between nodes in the network using complex framed overhead channels or packet communications. Embodiments of this invention increase the speed of fault detection and network protection switching by having intelligent optical switches with optical power detectors that can locally detect faults in the optical line. A network fault typically results in the loss or reduction of optical power. The intelligent optical switch autonomously switches from a traffic fiber pair to protection fiber pairs when a fault is detected. The switching results in other intelligent optical switches also detecting a loss or reduction in optical power, causing those switches to autonomously switch to protection fiber pairs. Loss of optical power caused by a network fault or by a switching event are each a physical layer trigger that causes an intelligent optical switch according to embodiments of this invention to autonomously switch from traffic fibers to protection fibers. Embodiments can also improve fiber utilization by allowing working lines to share a pool of protection paths.

Designing networks that are automatically protected against multiple worst-case fiber breaks can be difficult and expensive. As a result, many network protection configurations typically only provide automatic protection against single-fiber faults. The reasoning behind this is that a repair crew will be dispatched immediately after a single fault and hopefully fix the problem before another fault occurs. Many of the overall transport line and network availability calculations are dominated by a probability of a second fault occurring before the first fault is repaired.

Major disasters, like earthquakes and hurricanes, can often cause multiple fiber breaks in a network. The "shared pool"

concept can be extended to the difficult task of protecting a network against multiple fiber breaks by simply monitoring the protection paths in the same way as the working paths after they are provisioned. This allows the traffic-carrying protection paths to be protected by the remaining resources of the shared pool. If the network experiences a second fiber break on either a provisioned protection path or regular working line, the traffic is automatically switched to another protection path from the pool. The "shared pool" configuration can also enhance network availability by providing protection against multiple fiber faults.

The number of faults the network can tolerate is determined by the size of the spare fiber pool. While no system can protect against every contingency, having a network that can automatically reconfigure and recover from multiple fiber faults can greatly improve overall availability.

Embodiments of the present invention can be used to replace or supplement existing protection-switching methods in traditional systems like SONET. In practice, an embodiment can be integrated into existing systems as an enhancement for handling fiber faults. For example, the optical switches can communicate faults via physical layer triggering, as described above, but may also interface with the higher-level network control planes through a standard communication channel. In the event of a fiber break, a switch according to an example embodiment of the present invention automatically reconfigures communications traffic flow around the fault according to predefined rules and then informs the higher-level control plane via an upstream interface. Conversely, the higher-level control planes can command the switch to reconfigure in the event of non-fiber faults or turn off the automatic protection switching feature for maintenance operations. Embodiments of the present invention allow the working traffic lines to share efficiently several protection paths without the need for intervention from a higher-level network control layer.

An embodiment of the invention includes a pair of optical switches at each end of a communications path. Each switch is equipped with optical power detectors to protect against network faults that result in a reduction or loss of optical power without the need for intervention of higher-level network control planes or complex signaling.

Figure 1:
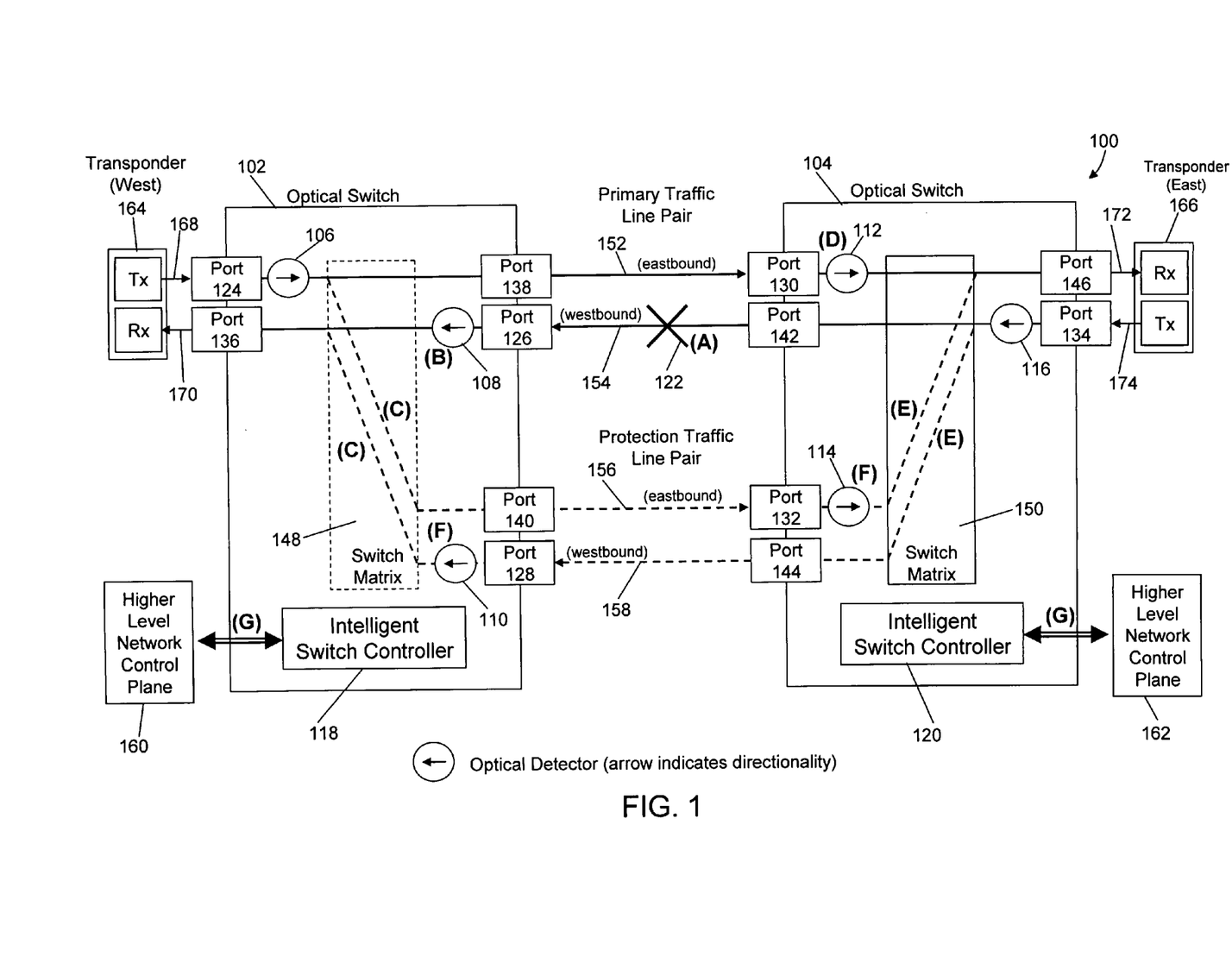
FIG. 1 is a schematic view of optical switches optically coupled by traffic path fibers and protection path fibers, and with optical power detectors at input optical ports.

FIG. 1 is a network diagram of one example embodiment 100. A fault 122 is detected using optical power detectors 106, 108, 110, 112, 114, 116 locally in each switch 102, 104, and each switch 102, 104 is configured to detect and react locally to the fault 122. The switches operate independently to detect faults 122 and initiate protection switches.

The switch detects the fiber fault 122 by using an intelligent switch controller 118, 120 within each switch 102, 104 to monitor loss of optical power at the receiver port 124, 126, 128, 130, 132, 134 of the optical switch 102, 104. In this example embodiment, the intelligent switch controller 118, 120 coordinates the reading of the line optical powers, the switching function, the storage of predefined rules for the switching, and communicating with external higher level network components.

Example embodiments of the invention described herein enable efficient use of protection fiber paths because the local switching control allows multiple working paths to share a pool of protection paths. The exact protection path for each working path does not need to be defined before a fiber fault occurs. Because the optical switches know which protection paths are in use at any time, they simply select the next available protection path and then report the network reconfiguration to the higher network control layers. These higher layers can download updated protection switching criteria at any time.

An example method of how to select the next available protection path can be determined by a variety of means. For example, one simple method is to pre-provision dark fiber protection paths and predetermine the order in which they are to be assigned to mitigate faults. This protocol enables multiple working paths connected to the switch to share efficiently a common pool of protection fibers and paths.

If both fibers in a line pair experience a fault or power degradation, then both switches detect the loss of power at the input ports and automatically switch.

Two useful optical switch characteristics for this application are low loss and fast switching times. The low loss minimizes the impact on the transmission line impairment budget; the fast switch time ensures the switching is completed before higher-level control plane layers intervene.

The protection switching may be independent of the number of intermediate switches or node hops. In the case where many optical switches are included in the path only the switches at the end of the path are needed to perform a protection switch. However, as the number of intermediate switches or node hops increases, it becomes advantageous to use switches capable of switching in the absence of light, i.e., "dark fiber switches." In a network configured with dark fiber switches, the switches in a network pathway can align themselves simultaneously when a switching event occurs, resulting in a total switching time approximately equal to the time required for a single switch to perform a switching event, regardless of the number of switches in the network pathway. By contrast, if a network is not configured with dark fiber switches, the switches can only align themselves after an optical signal is present, so each switch must wait for preceding switches in a network pathway to align before being able to align. Consequently, the total switching time increases to approximately the time required for a single switch to perform a switching event multiplied by the number of switches in the network pathway.

The physical layer triggering, thus far, has been described as a loss or reduction of optical power caused by a network fault or a switch diverting an optical signal to a protection pathway. However, the physical layer triggering between switches at the ends of the network may utilize a more sophisticated system using amplitude, phase or frequency modulation of the traffic signal. The physical layer triggering between switches at the end of the network can also be accomplished by a non-communication signal.

Example Embodiment Using Optical Switches with Input Power Detectors

Referring now to FIG. 1 in more detail, the two optical switches 102, 104 are shown with each switch 102, 104 including ports 124, 126, 128, 130, 132, 134, 136, 138, 140, 142, 144, 146, optical power detectors 106, 108, 110, 112, 114, 116, a switch matrix 148, 150 and intelligent optical switch controller 118, 120. The ports 124, 126, 128, 130, 132, 134, 136, 138, 140, 142, 144, 146 define the fiber connection points to each switch 102, 104. The optical detectors 106, 108, 110, 112, 114, 116 are positioned at the switch input ports 124, 126, 128, 130, 132, 134 and have directionality where they detect the optical power in the direction of the arrow. The switch matrices 148, 150 are fully non-blocking switch matrices. A symmetric N×N or asymmetric N×M switch matrix 148, 150 may be used. The intelligent switch controller 118, 120 of each switch coordinates the reading of optical power within the switch, the switching function, the storage of the predefined rules for the switching, and the communicating with external higher level network components. The predefined protection paths 156, 158 can be downloaded or changed at any time via a communications interface (not shown) and the switch can report all protection configurations changes, switch settings and diagnostics via any form of communications channel. The switch can be configured manually or automatically, to respond to the network fault 122. The intelligent switch controllers 118, 120 can operate autonomously in each node in terms of identifying a loss of optical power in one or two directions and cause the respective switch matrices 148, 150 to switch optical signals from a working path 152, 154 to a protection path 156, 158.

The switches 102, 104 are configured into a network by interconnecting them with a primary traffic line pair 152, 154 and a protection line pair 156, 158. The primary traffic line pair 152, 154 and protection line pair 156, 158 each includes, for example, a westbound fiber 154, 158 and eastbound fiber 152, 156. The two optical switches 102, 104 are connected via a westbound and eastbound fiber pair. A west transponder 164 is connected to optical switch 102 with the transmitter (TX) connected to port 124 and the receiver (RX) connected to port 136. Likewise, an east transponder 166 is connected to ports 134 and 146 of optical switch 104 with the TX and receiver connected to ports 134 and 146, respectively. The predefined protection path 156, 158 between the switches 102, 104 is connected with the eastbound protection fiber 156 connected between switch 102 at port 140 and switch 104 at port 132 and the westbound fiber 158 connected between switch 102 at port 128 and switch 104 at port 144.

While the detection of fiber faults at the Tx and Rx nodes 164, 166 at the ends of an optical transmission path and control plane techniques for changing traffic flow to avoid fiber faults are well documented in the literature, a combination of local detection and protection switch initiation and physical layer triggering between the switches by moving multiple fibers in combination is being distinguished herein from traditional detection and fault correction.

Prior to network fault 122 in network 100, switches 102, 104 are routing communications traffic signals from transponders 164, 1666 via primary traffic line pair 152, 154. After fault 122 occurs and is detected by switches 102, 104, the switches autonomously switch the communications traffic signals to protection line pairs 156, 158.

Figure 2:
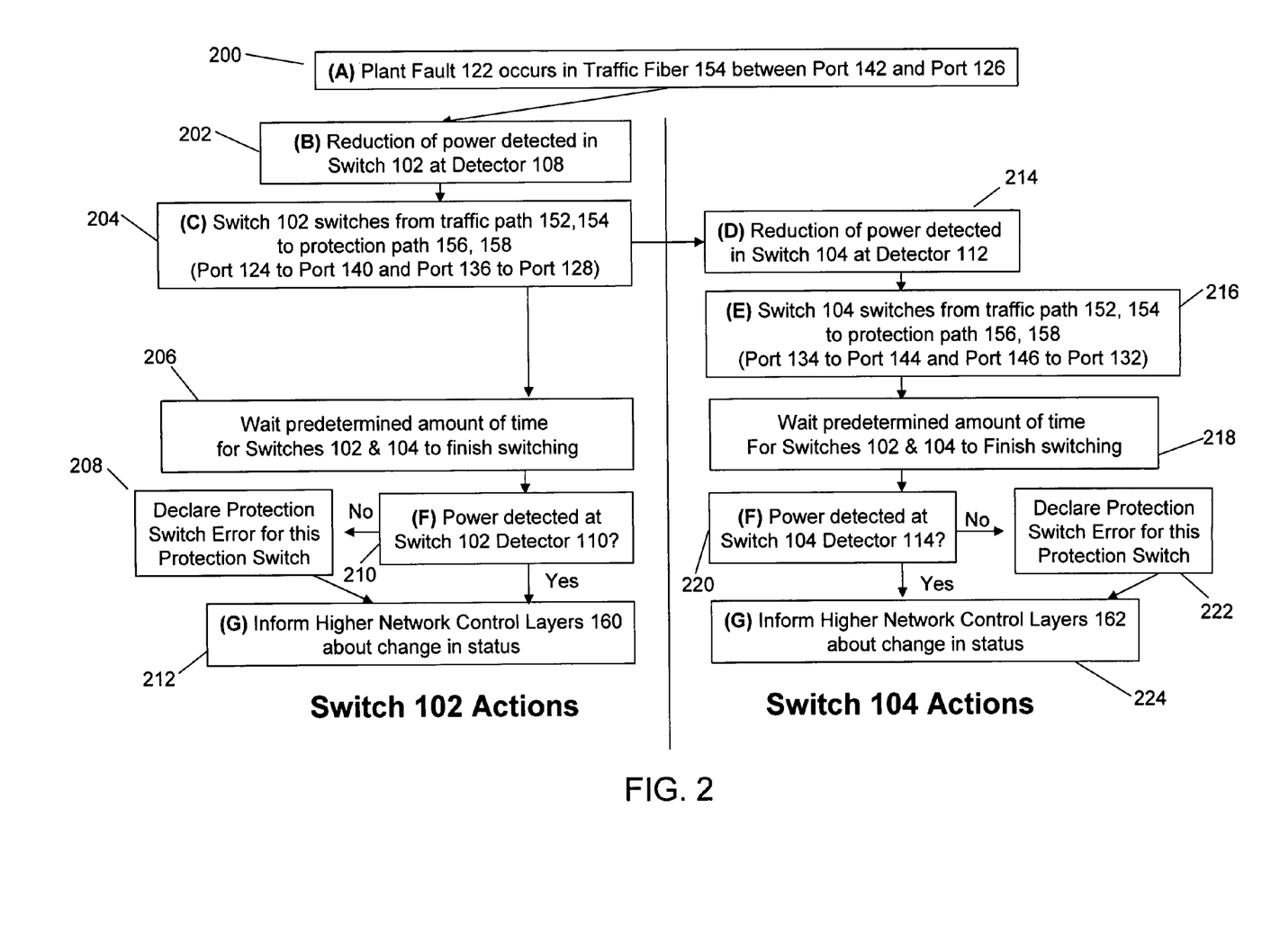
FIG. 2 is a process flow diagram for the switches of FIG. 1 detecting a traffic path fault and switching to the protection path fibers.

FIG. 2 is a flow diagram that shows how a fault 122 is detected and how the network protection switch is performed in reference to the network configuration of FIG. 1. A fault is defined as any fiber or equipment failure or degradation that results in loss of optical power in the transmission line. For example, if the fault 122 (or degradation) occurs that changes the optical line power of westbound fiber 154, it is detected by optical power detector 108. The fault 122 or degradation can be caused by any usual fault-causing condition in the traffic line optical path prior to the detector, such as optical switch 104 path failure, an optical line failure, or an input port failure in switch 102. In this example, the optical power loss is caused by a fiber fault 122 on westbound traffic fiber 154 and the loss of power is detected in at power detector 108.

There are many criteria that can be used to detect faults 122. One criterion can be an absolute reference level where a predetermined power level is selected and a fault is declared when the power drops below a predetermined level. Another criterion can be a relative reference level in which a predetermined power drop is selected and a fault is declared when the power drops by the predetermined amount. Many other techniques can be used, such as delaying the declaration of a fault until the level or change in power threshold has been exceeded for a predetermined amount of time or comparing optical powers over time.

After detecting the fault at 202, the switch 102 that detects the fault and then switches both the eastbound and westbound traffic paths 152, 154 to the corresponding eastbound and westbound protection paths 156, 158 at 204. Switching from the eastbound traffic line 152 to the eastbound protection path 156 provides a physical layer trigger that causes a loss of power that is detected at the corresponding optical power detector 112 at 214. Switch 104 then switches both the eastbound and westbound traffic fibers to the predetermined protection path 156, 158, reestablishing the traffic connection at 216.

The integrity of the protection switch can be checked by monitoring the power at optical power detectors 110 and 114. At 206, 218, both switch 102 and switch 104 wait a predetermined amount of time for both switches 102, 104 to complete the protection switch 204, 216. If power is not detected at optical power detectors 110, 114 after the wait period at 210 and 220, then the protection switch was not successfully completed and each switch sets a protection switch error flag at 208, 222 for this protection switch. The protection switch event and status can be sent via the communications channel to the higher network layers at 212, 224.

The switch can also have a pre-programmed list of actions in the event of the protection switch errors, such as switching through multiple protection paths at a given rate. Finally, the intelligent switch controllers 118, 120 in switches 102, 104 then report the results to the higher level network control plane 160, 162. The switches 102, 104 may report information that includes the change of status of the network connections, the optical power readings, the protection switch error flags, other switch status flags and any other pertinent information.

Since the switches 102, 104 also have input power detectors 106, 116 that are monitoring the power of the TX 164, 166, the switches 102, 104 can determine if their respective local TX 164, 166 lasers have failed and inform the higher level network control plane 160, 162 so an appropriate equipment repair or higher level network protection switch can be made. In this embodiment, input optical power detector 106 and input optical power detector 116 can detect if the source laser in the respective TXs 164, 166 have failed. The optical switches 102, 104 can also be programmed to switch automatically to backup transponders (not shown) when a TX 164, 166 failure is identified. Again, that switch may inform the higher level network control layers of the configuration change.

Another way to handle this special case of a TX failure is to have the switches 102, 104 reset themselves back to the original configurations if the protection switch error is raised or if another pre-determined action occurs. Another way is to simply let them be reset by the higher level control planes 160, 162 when appropriate.

This mechanism is fast because the detection of fiber faults 122 and protection switching control are done locally within the switching hardware at each node. Failures are detected in one of the switches at the end of the fiber path. The switching order depends on whether the fault is located in the eastbound fiber paths 152, 156 or westbound fiber paths 154, 158.

An alternative example embodiment is where the intelligent switch controller 118, 120 can also directly communicate between other optical switches to coordinate further optical switching among many other optical switches.

Example Embodiment Using Optical Switches with Output Power Detectors

Monitoring with output (egress) port optical power detectors allows for detecting faults in a greater portion of the connection path between the transponders than using input (ingress) optical power detectors. With only input (ingress) port optical power detectors on the switches, it is impossible to detect failures in the switch matrix before the RX since the detector is on the input port just before the switch matrix.

Figure 3:
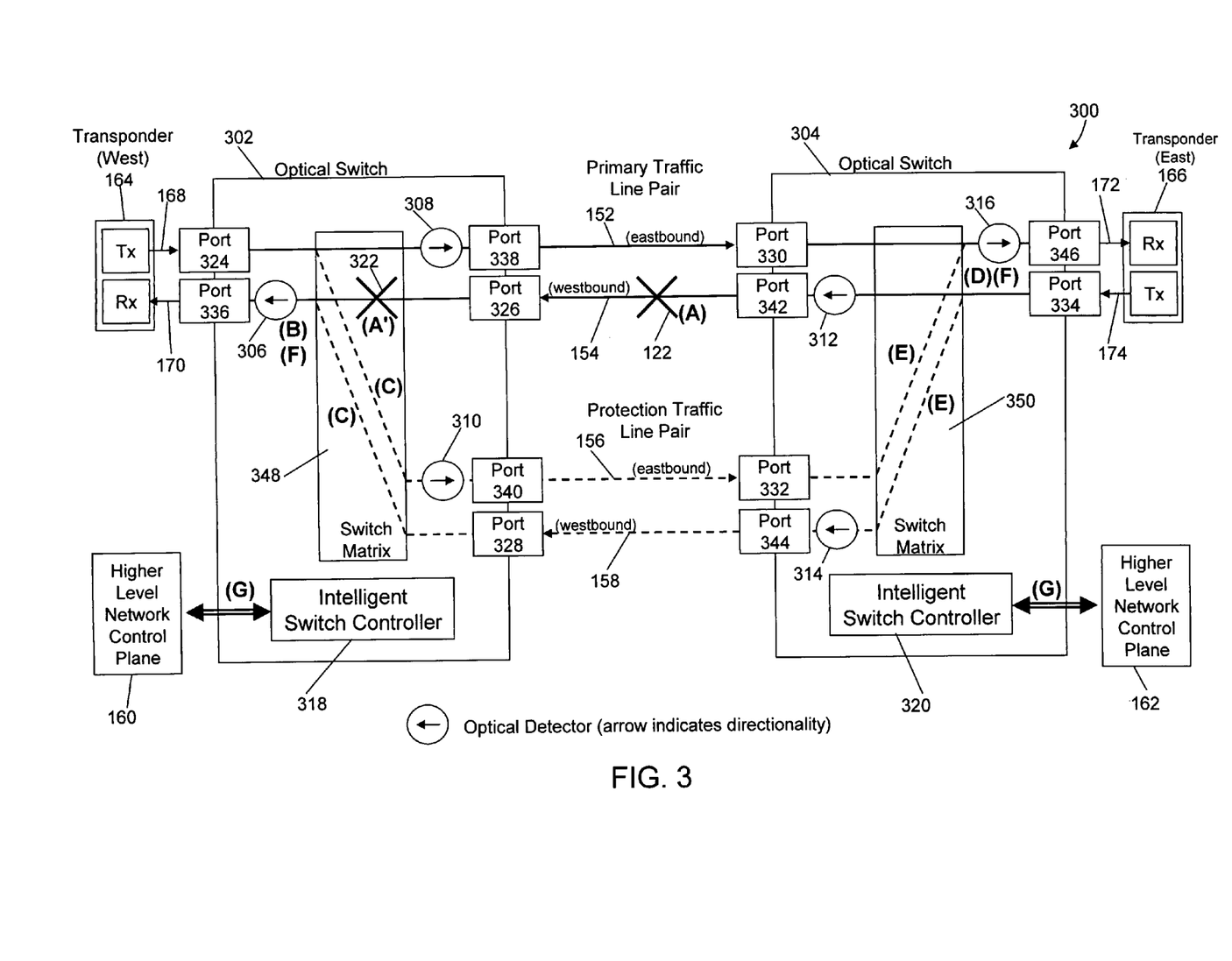
FIG. 3 is a schematic view of optical switches optically coupled by a traffic path and a protection path, and with optical power detectors at output (egress) optical ports.

FIG. 3 shows the network connections with switches 302 and 304 configured with output power detectors 306, 308, 310, 312, 314, 316. The switches 302, 304 are interconnected with traffic fiber pairs 152, 154 and protection fiber pairs 156, 158.

Figure 4:
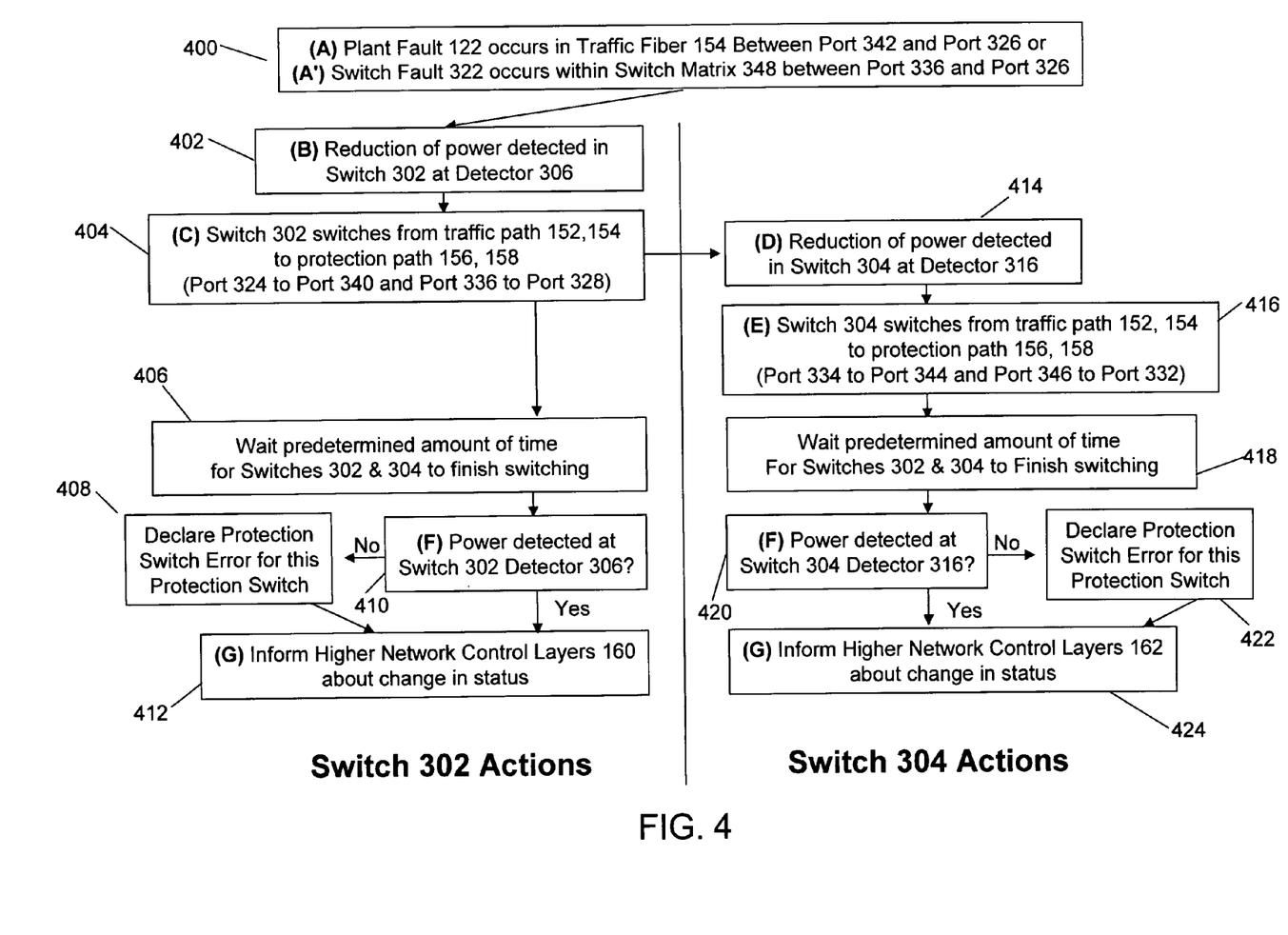
FIG. 4 is a process flow diagram for the switches of FIG. 3 detecting a traffic path or switch matrix fault and switching to the protection path fibers.

The operation for detecting faults 122, 322 and protection switching is similar to the input power detecting case of FIG. 1 and is described in the FIG. 4 flow diagram, which is similar to the flow diagram of FIG. 2 and not described in detail for the sake of brevity but should be understood from the flow diagram directly. In this case, if a switch fault occurs in the switch 302 matrix, it is detected by output optical power detector 306. Thus, output optical power detectors 308 and 312 can detect faults in the switching matrices 348, 350 or the TXs 164, 166.

Example Embodiment Using Switches with Both Input and Output Power Detectors

Monitoring with both input and output optical power detectors in the optical switches allows for both detecting faults over the same portion of the optical path as the case with output detectors and in addition being able to determine the location of the fault.

Figure 5:
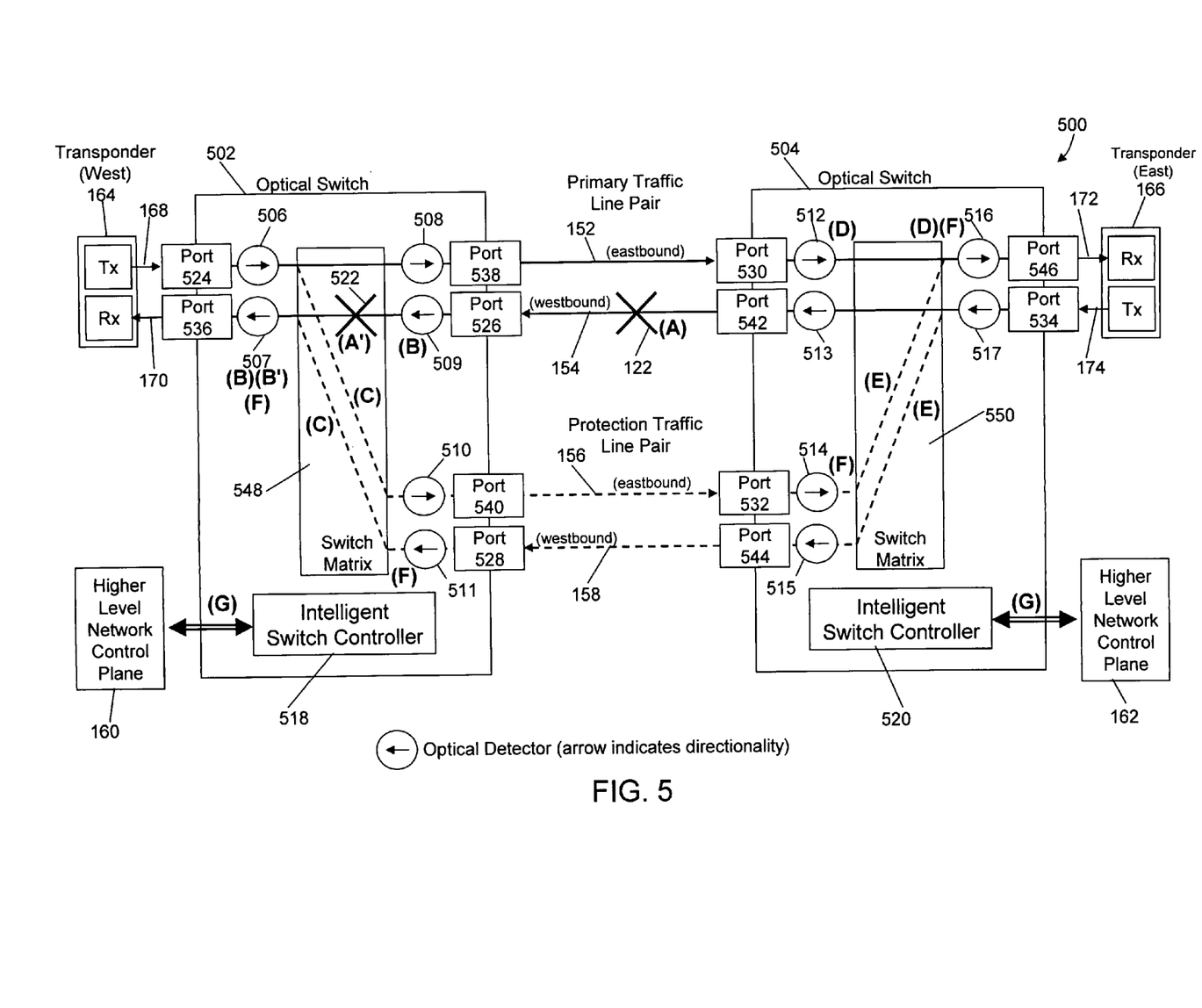
FIG. 5 is a schematic view of optical switches optically coupled by a traffic path and a protection path, and with optical power detectors at both output (egress) optical ports and input (ingress) optical ports.

FIG. 5 shows an embodiment of the invention with both input optical power detectors 506, 509, 511, 512, 514, 517 and output optical power detectors 507, 508, 510, 513, 515, 516 in optical switches 502, 504. Using both input optical power detectors 506, 509, 511, 512, 514, 517 and output optical power detectors 507, 508, 510, 513, 515, 516, the fault location can be determined to be in the TX 164, 166, the line pair 152, 154 or 156, 158 or one of the switch matrices 548, 550 by comparing optical power readings in different locations along the connection path.

Figure 6A:
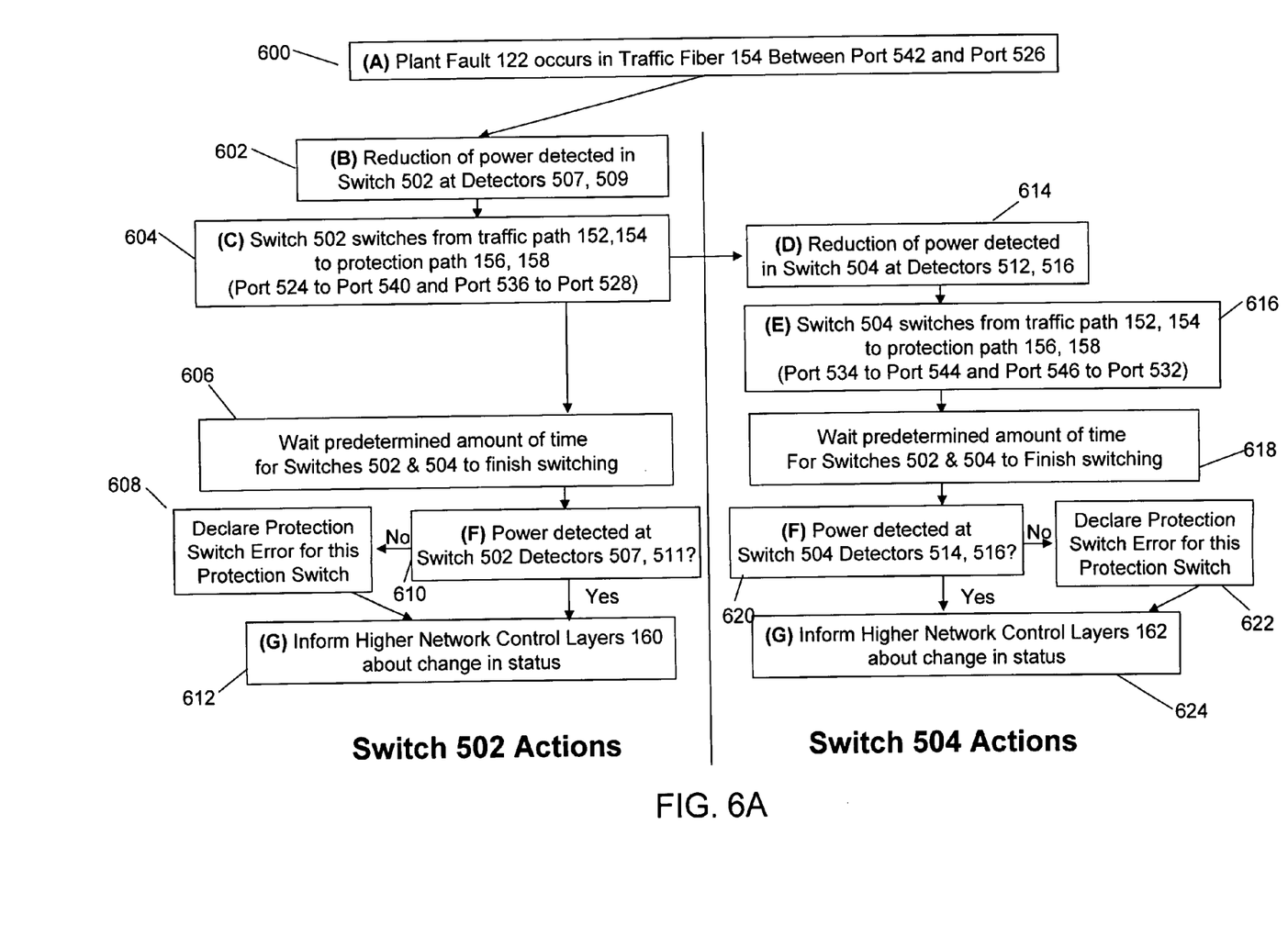
FIG. 6A is a process flow diagram for the switches of FIG. 5 detecting a traffic path fault and switching to the protection path fibers.
Figure 6B:
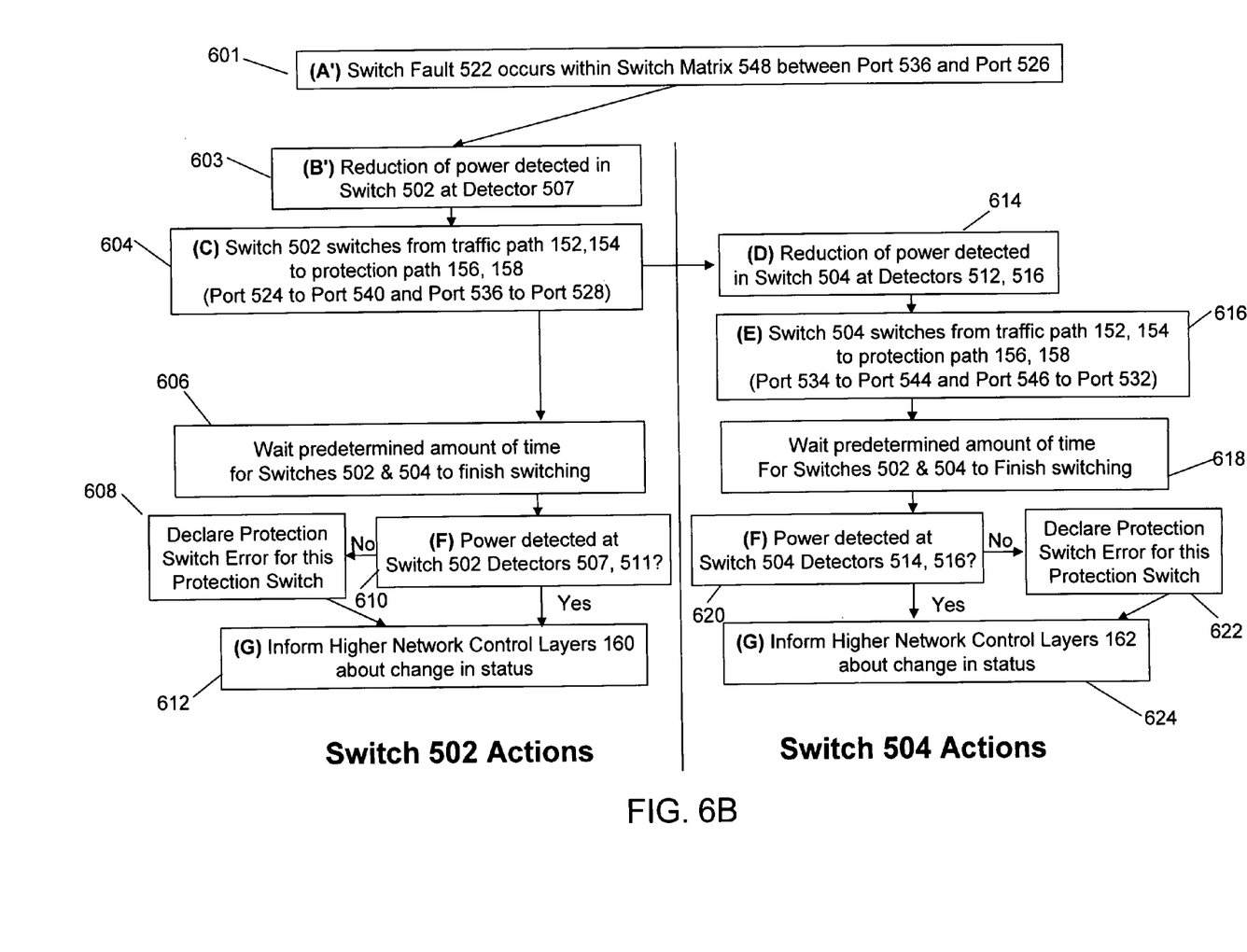
FIG. 6B is a process flow diagram for the switches of FIG. 5 detecting a switching matrix fault and switching to the protection path fibers.

The location of the fault is determined by reading and comparing the detected optical powers at the input ports 524, 526, 528, 530, 532, 534 and output ports 536, 538, 540, 542, 544, 546 of the switches 502 and 504 connecting to traffic lines 152, 154. This is accomplished, for example, by sequentially comparing detected optical power at optical power detectors 517, 513, 509, 507, starting from the transmitter end of the optical path and reading the optical detectors sequentially along the line until a drop in power is found. The fault 122, 522 is located between the detector with the power drop and the previous detector with no power drop. The operation for protection switching using both input optical power detectors 506, 509, 511, 512, 514, 517 and output optical power detectors 507, 508, 510, 513, 515, 516 is shown in FIG. 6A flow diagram for detecting a plant fault 122 and FIG. 6B shows the flow diagram for detecting a switch path fault 522. In each case, protection switching is similar to the flow diagram of FIG. 2 ad is not described in detail for the sake of brevity. The protection switching should be understood from the flow diagrams in FIGS. 6A and 6B directly.

Controllers 518, 520 can determine the location of a fault when using both input optical power detectors and output optical power detectors by comparing detector optical powers:

1. If optical power detector 517 detects a reduction in power, then the fault is located in the connection path before optical power detector 517. The fault is located in TX 166 or in connection 174 between TX 166 and switch 504.

2. If a reduction in power is detected by optical power detector 513 and detected optical power at optical power detector 517 is unchanged, then the fault is located within switch 504.

3. If a reduction in power is detected at optical power detector 509 and detected optical power at optical power detector 513 is unchanged, then the fault 122 is located in traffic line 154 between switches 502 and 504.

4. If a reduction in optical power is detected at optical power detector 507 and detected optical power at optical power detector 509 is unchanged, then the fault 522 is located within switch 502.

5. The higher level control plane 160, 162 can determine if the RX 164 has failed by a query of the optical power detectors along the line. If no faults are detected anywhere in the line, then the fault is located in the RX 164 or on line 170 between switch 502 port 536 and the RX 164.

The fault determination method just described also applies in the opposite direction using optical power detectors 506, 508, 512, 516.

Figure 7:
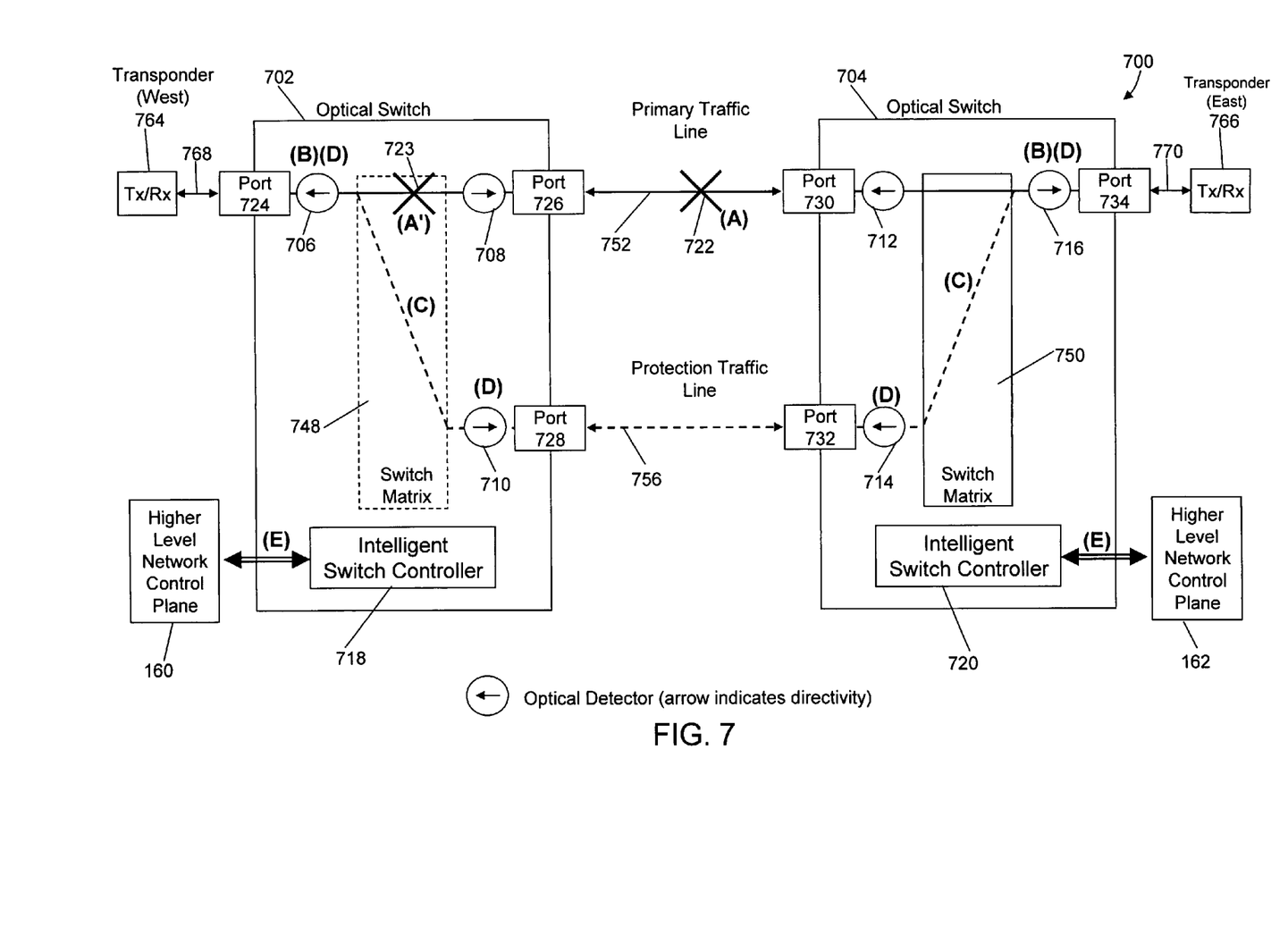
FIG. 7 is a schematic view of optical switches optically coupled by a traffic path bi-direction fiber and a protection path bi-direction fiber, and with optical power detectors detecting optical power at each port in the output (egress) direction.
Figure 8:
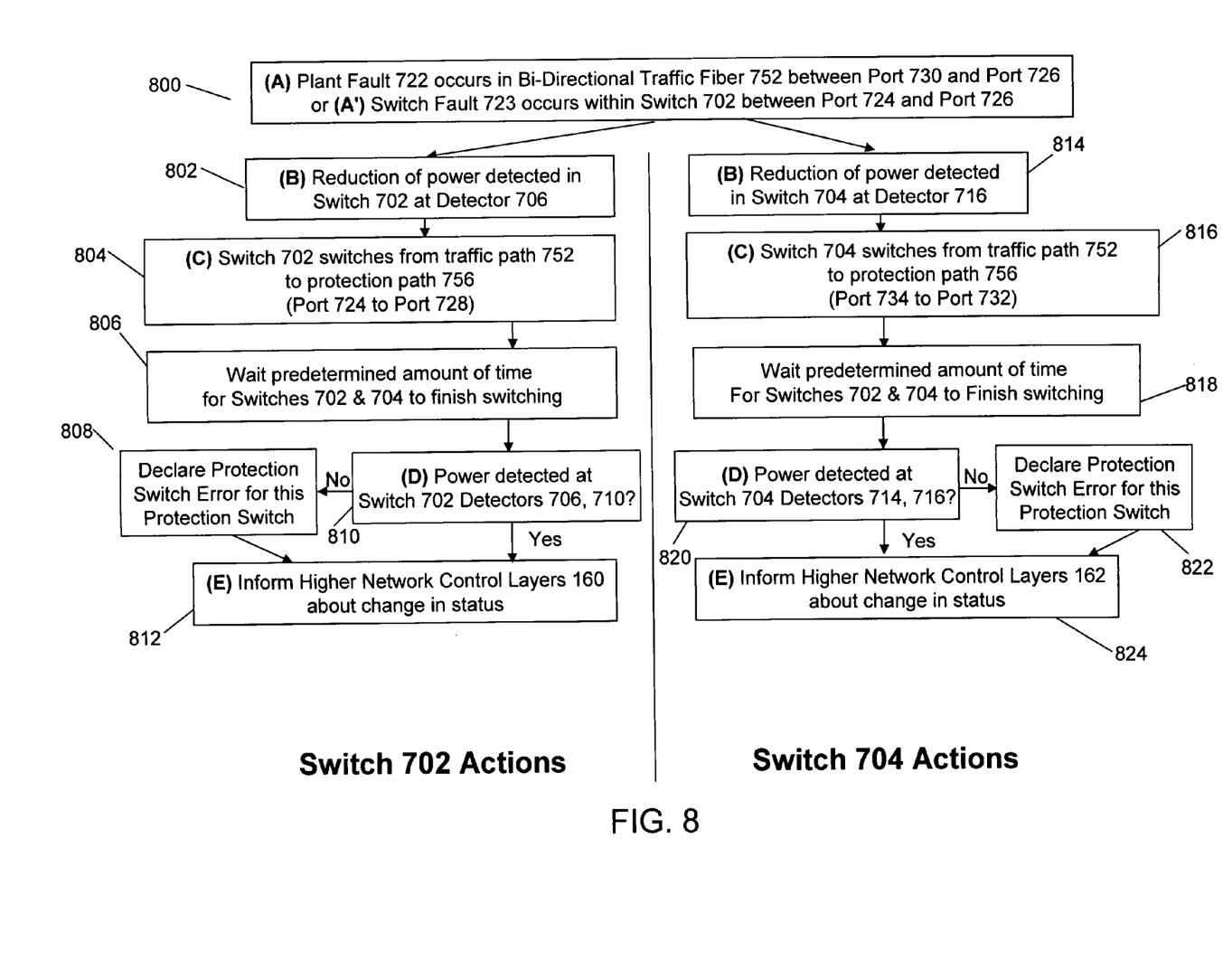
FIG. 8 is a process flow diagram for the switches of FIG. 7 detecting a traffic path or switch matrix fault and switching to the protection path fiber.

Example Embodiment on Bi-Directional Fiber Systems Using Optical Switch with One Optical Detector per Switch Port FIG. 7 shows the operation of switches 702, 704 with bi-directional traffic on a single fiber optical line 752, 756 where each switch has a single directional optical power detector 706, 708, 710, 712, 714, 716 per switch port 724, 726, 728, 730, 732, 734. In bi-direction fiber systems, both the east and westbound traffic, for example, share the same optical fiber 752, 756. The faults 722, 723 are detected by monitoring the optical powers locally in each switch 702, 704. A fiber plant fault 722 on traffic fiber 752 causes detected power to drop at both optical power detector 706 and optical power detector 716. In this case, controllers 718, 720 cause switches 702, 704 to switch to ports 728, 732, respectively, to use protection path 756. The flow diagram for this protection switch is given in FIG. 8, which is similar to the flow diagram of FIG. 2 and is not described in detail for the sake of brevity, but should be understood from the flow diagram in FIG. 8.

The optical power detectors 708, 712 in switches 702, 704 can determine whether the input power from the TXs 764, 766 has dropped.

In an alternative embodiment the detectors directivity could be reversed, i.e., the output optical power detectors can be replaced by input optical power detectors.

Figure 9:
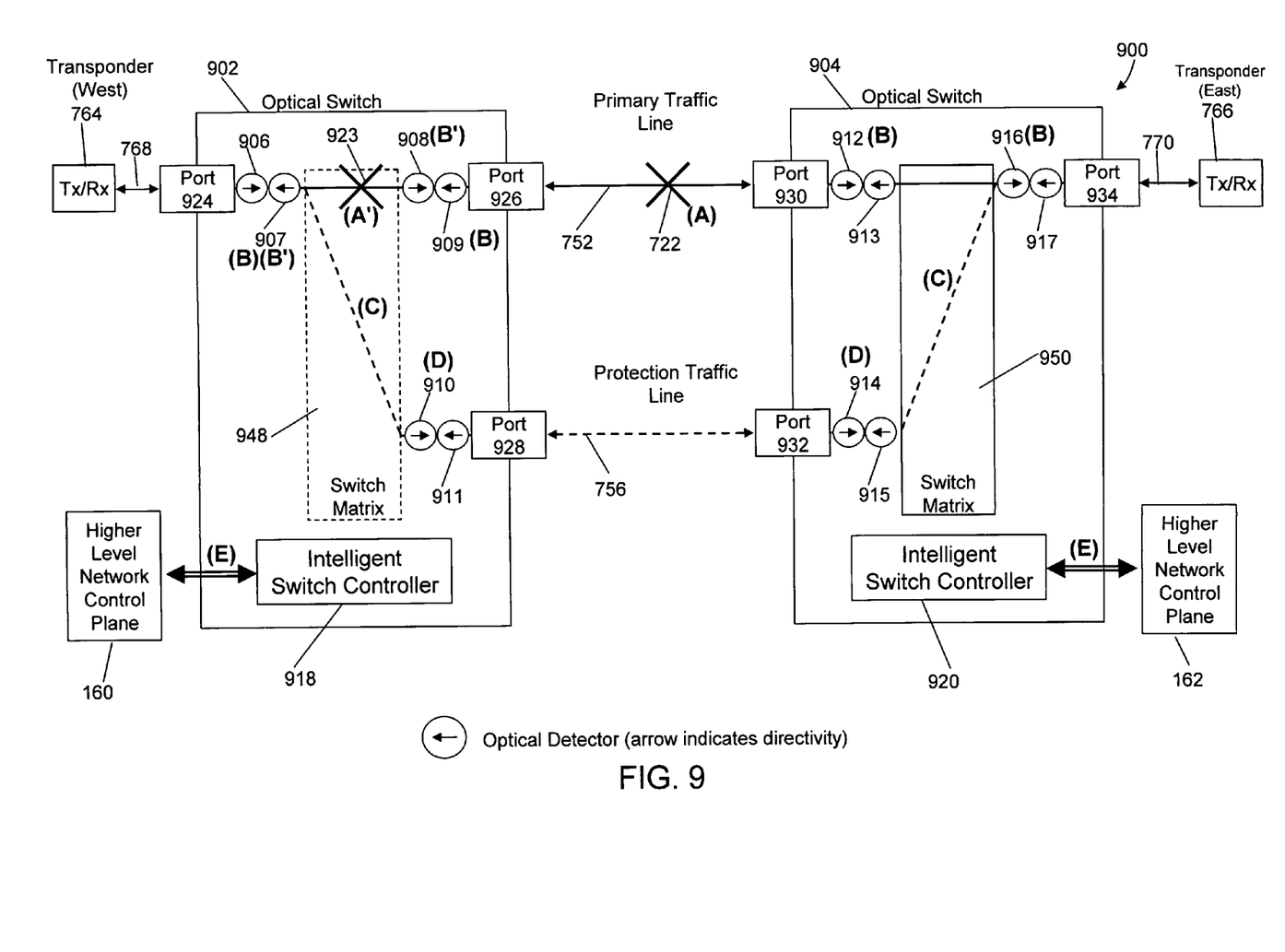
FIG. 9 is a schematic view of optical switches optically coupled by a traffic path bi-directional fiber and a protection path bi-directional fiber, and with optical power detectors detecting optical power at each port in both the output (egress) direction and input (ingress) direction.

Invention Embodiment on Bi-Directional Fiber Systems Using Optical Switch with Multiple Optical Detectors per Switch Port FIG. 9 shows the operation of switches 902, 904 with bidirectional traffic on a single fiber optical line 752, 756 where each port 924, 926, 928, 930, 932, 934 has two directional optical power detectors 906, 907, 908, 910, 911, 912, 913, 914, 915, 916, 917 with the directivity of the two detectors in any port having opposite directions. The extra detectors allow for both fault detection and determination of the location of the fault. Using both input and output optical power detectors, the fault location 722, 923 can be determined to be in the TX 764, 766, the line 752, or one of the switch matrices 948, 950 by comparing detected optical power at different ports along the connection path.

Figure 10A:
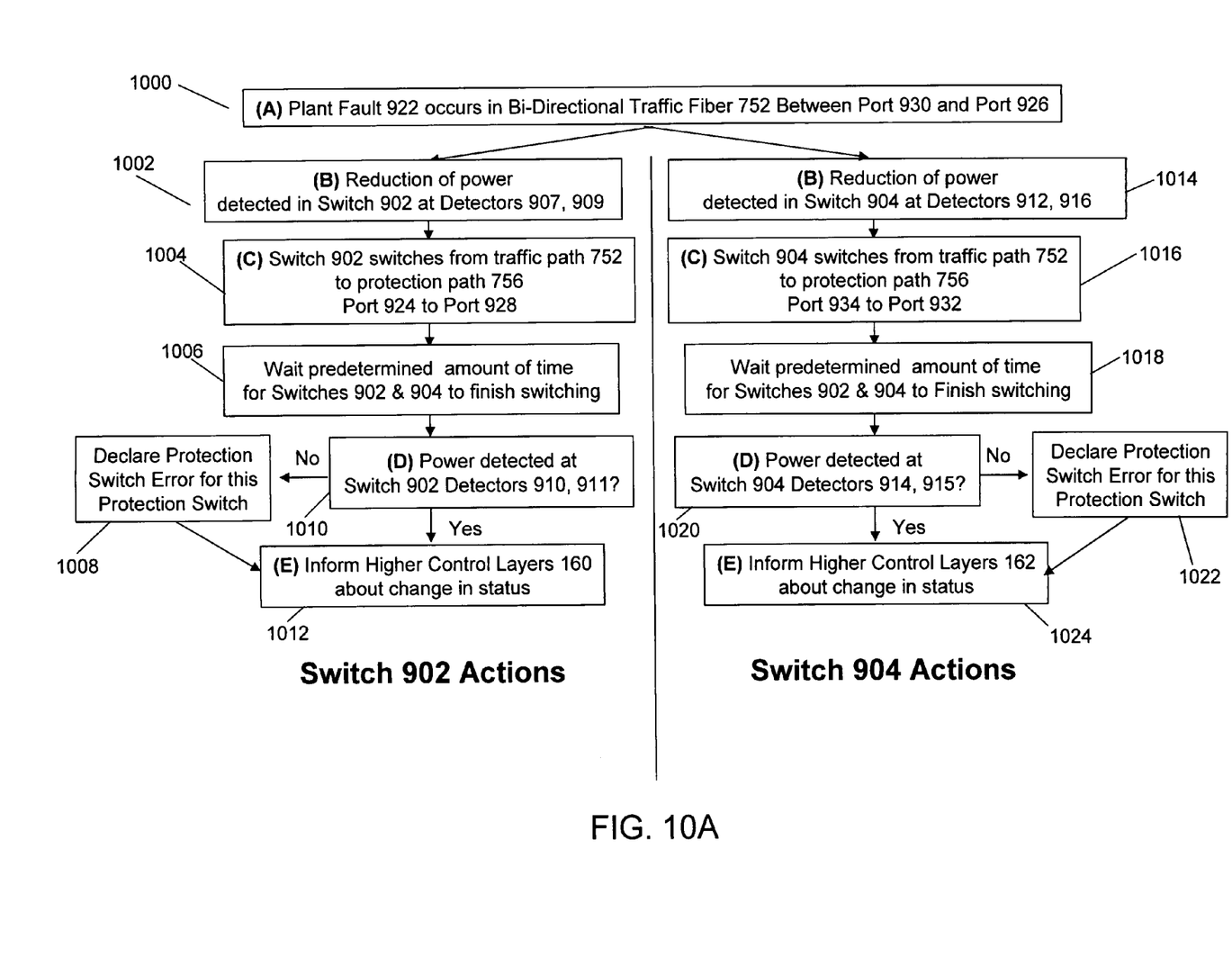
FIG. 10A is a process flow diagram for the switches of FIG. 9 detecting a traffic path fault and switching to the protection path fiber.
Figure 10B:
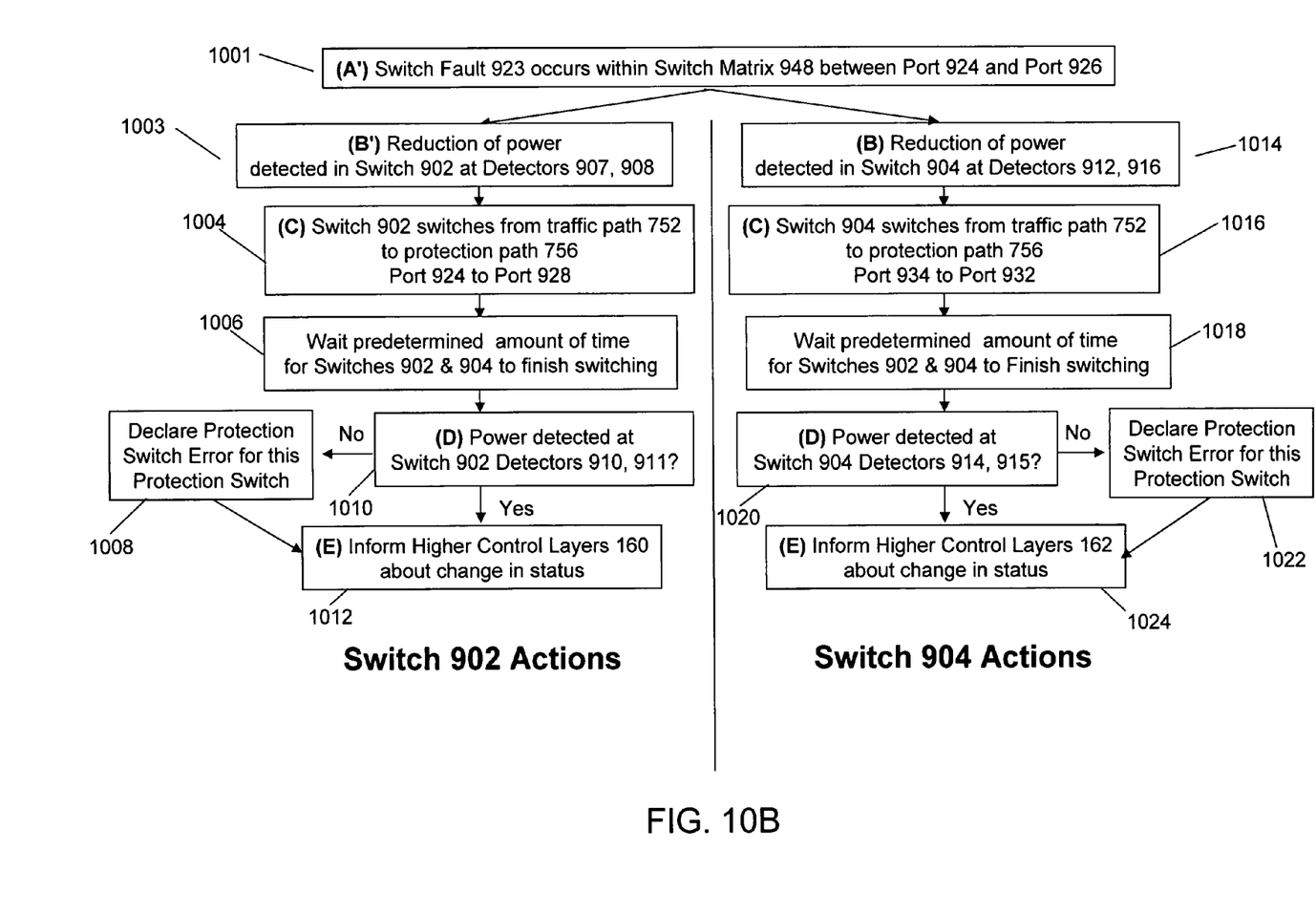
FIG. 10B is a process flow diagram for the switches of FIG. 9 detecting a switch matrix fault and switching to the protection path fiber.

A fiber fault 722 on the primary fiber 752 or a fault 923 in one of switch matrices 948, 950 causes detected optical power to drop at both optical power detector 907 and optical power detector 916. In this case, both switches 902, 904 would switch to ports 928, 932, respectively, to use protection path 756. The flow diagram for this protection switch is shown in FIGS. 10A and 10B. In each case, protection switching is similar to the flow diagram of FIG. 2 and is not described in detail for the sake of brevity. The protection switching should be understood from the flow diagrams in FIGS. 10A and 10B.

The location of the fault is determined by reading and comparing the optical powers from the input and output ports of both switches 902 and 904 on traffic line 752. This is achieved by comparing the optical power detector measurements starting from the transmitter end 764, 766 of the optical path and reading the optical power detectors 906, 908, 912, 916 or 917, 913, 909, 907 sequentially along the line until a drop in power is found. The fault is located between the detector with the power drop and the previous detector with no loss in power.

Determining the Location of a Fault When Using Two Detectors per Switch Port on Bi-Directional Fiber Systems by Comparing Detector Optical Powers:

Controllers 918, 920 determine the location of a fault by comparing detector optical powers:

1. If optical power detector 917 detects a reduction in optical power, then the fault is located in the connection path before optical port 934. The fault is located in TX 766 or in the connection 770 between TX 766 and port 934.

2. If a reduction in power is detected at optical power detector 913 and detected optical power at optical power detector 917 is unchanged, then the fault (not shown) is located within switch 904.

3. If a reduction in power is detected at optical power detector 909 and detected optical power at optical power detector 913 is unchanged, then the fault 722 is located in the fiber 752 between switches 902 and 904.

4. If a reduction in power is detected at optical power detector 907 and detected optical power at optical power detector 909 is unchanged, then the fault 923 is located within switch 902.

Alternatively, implementation of the two optical detectors at each port could be combined into a single bi-directional detector.

Protecting Against Multiple Faults

Embodiments of the invention can be applied to the difficult task of protection against multiple network faults. This is achieved by monitoring the protection paths the same way as the primary traffic path after a protection path is provisioned and allowing the protection paths to use the remaining pool of spare fiber paths. The communication traffic automatically switches to another protection path in the pool if a subsequent fiber failure occurs in the protection path. This feature can greatly enhance overall network reliability and availability.

This allows for efficient use of protection fibers because the local switching control allows the working fiber paths to share multiple protection fiber paths based on predetermined criteria. The exact protection path does not need to be predetermined before a fiber fault occurs. The mechanism simply selects the next available fiber path out of each node path based on a predetermined hierarchy. Because the local protection switch knows which protection paths are in use at any time it simply selects the next available path and can report when all the protection paths are in use to the higher network control layers. Information on the state of the protection switching can be relayed by the switching element to the higher level network control plans and protection switching criteria can be downloaded from higher level network control layers.

The exact protection fiber used for a particular working fiber failure does not need to be predetermined. The method of how to select the next available protection path can be determined by a variety of means. For example, one simple method comprises pre-provisioning protection paths and then pre-determining the order in which they will be assigned to mitigate network faults. This allows multiple working paths connected to the switch to efficiently share a common pool of protection fibers and paths.

Figure 11:
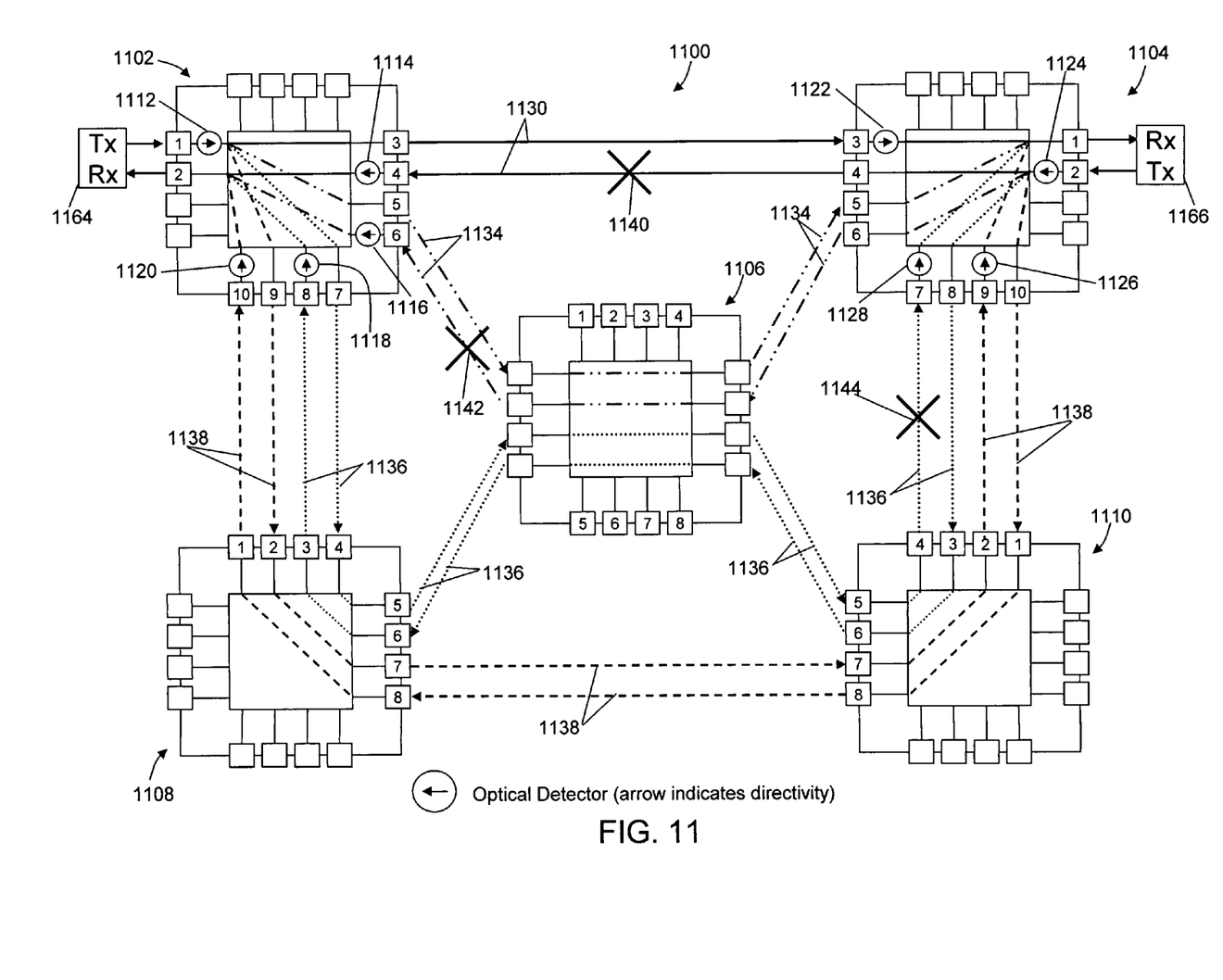
FIG. 11 is a schematic view of optical switches optically coupled to provide a traffic path and multiple protection paths between two transmitter/receivers.

An illustration of protecting against multiple network faults is shown in FIG. 11. FIG. 11 shows a network 1100 with five switches 1102, 1104, 1106, 1108, 1110 equipped with input optical power detectors 1112, 1114, 1116, 1118, 1120, 1122, 1124, 1126, 1128. Transponders 1164, 1166 are initially connected via a primary traffic fiber pair 1130 and have a pool of three pre-defined protection paths 1134, 1136, 1138 that may be shared among many other transponder pairs (not shown). The pre-defined protection paths 1134, 1136, 1138 are pre-provisioned to enable fast protection switching.

Traffic and Protection Path Fiber Pair Connections:

Primary Traffic Path 1130: Switch 1102 to switch 1104

Protection Path 1 1134: Switch 1102 to switch 1106 to switch 1104

Protection Path 2 1136: Switch 1102 to switch 1108 to switch 1106 to switch 1110 to switch 1104

Protection Path 3 1138: Switch 1102 to switch 1108 to switch 1110 to switch 1104

When fault 1140 occurs on the primary traffic path 1130 between switch 1102 and switch 1104, it is detected in Switch 1102 at optical power detector 1114 and an automatic protection switch is performed to protection path 1134. After protection path 1134 is established, it is monitored and protected by the remaining un-provisioned protection path pairs 1136, 1138 in the pool. When fault 1142 occurs on protection path 1134 between switch 1102 and switch 1106, it is detected in Switch 1102 at optical power detector 1116 and an automatic protection switch is performed to protection path 1136. Finally, when fault 1144 occurs on protection path 1136 between switches 1110 and 1104, it is detected at switch 1104 by optical power detector 1128 and an automatic protection switch is performed to protection path 1138.

The three network faults 1140, 1142, 1144 could also occur at the same time instead of in sequential order. The switches can be pre-programmed to automatically move to the next available protection path if a protection path error is raised. In this case, if the three faults occurred at the same time, the switches 1102 and 1104 would first switch to protection path 1134. When the protection switch error is raised on protection path 1134, switches 1102 and 1104 would automatically switch to protection path 1136. Finally, when the protection path error is raised on protection path 1136, switches 1102 and 1104 would successfully protection switch to protection path 1138. In this case, where protection switch errors are present, the switch waiting times could be adjusted to accommodate differences in switching times.

The higher level control system could combine the power readings from the detectors in the optical switches with other network performance monitoring and fault detection criteria to determine network reconfigurations. In a network, switches with different detector configurations could be combined in any manner for protection switching.

The method of protecting against multiple faults can also be applied to networks with optical switches using any combination if input and output detectors or networks with mixes of switches with different detector configurations and switching characteristics.

The method of protecting against multiple faults can also be applied to networks with bi-directional fiber systems with optical switches using any combination of single or dual detectors per switch port or networks with mixes of switches with different detector combinations and switching characteristics.

While this invention has been particularly shown and described with references to example embodiments thereof, it will be understood by those skilled in the art that various changes in form and details may be made therein without departing from the scope of the invention encompassed by the appended claims.

What is claimed is:

1. An optical switch, comprising:
a first plurality of optical ports;
a second plurality of optical ports;
a switching matrix optically coupling optical ports of the first plurality of optical ports to optical ports of the second plurality of optical ports;
optical power detectors located at optical ports of the first plurality of optical ports and of the second plurality of optical ports;
a controller configured to cause the switching matrix to decouple a first optical port of the first plurality of optical ports from a first optical port of the second plurality of optical ports and couple the first optical port of the first plurality of optical ports to a second optical port of the second plurality of optical ports responsive to an optical power detector's detecting a drop in optical power below a threshold level; and
the controller is further configured to cause the switching matrix to decouple the first optical port of the first plurality of optical ports from the second optical port of the second plurality of optical ports and couple the first optical port of the first plurality of optical ports to a third optical port of the second plurality of optical ports responsive to optical power detectors at the optical port of the first plurality of optical ports and at the second optical port of the second plurality of optical ports detecting optical power below the threshold level within a designated time interval.

2. The optical switch of claim 1, wherein the optical ports of the first plurality of optical ports and the optical ports of the second plurality of optical ports are arranged as pairs of ports, a first port of the pair configured to transmit optical signals and a second port of the pair configured to receive optical signals.

3. The optical switch of claim 2, wherein some of the optical power detectors are located at the second port of each pair configured to receive optical signals and measure optical power of optical signals received at the second ports.

4. The optical switch of claim 2, wherein some of the optical power detectors are located at the first port of each pair configured to transmit optical signals and measure optical power of optical signals transmitted at the first ports.

5. The optical switch of claim 2, wherein the optical power detectors are located at both the first port of each pair configured to transmit optical signals and the second port of each pair receiving optical signals, the optical power detectors at the first ports configured to measure optical power of optical signals transmitted at the first ports and the optical power detectors at the second ports configured to measure optical power of optical signals received at the second ports.

6. The optical switch of claim 5, wherein the controller is further configured to compare detected power at an optical power detector of a port of the first plurality of optical ports to detected power at an optical power detector of a port of the second plurality of optical ports to which the port of the first plurality of optical ports is coupled via the switching matrix; and
wherein the controller is further configured to report any difference in detected optical power exceeding a threshold level to a network administrator via a network control plane.

7. The optical switch of claim 1, wherein optical ports of the first plurality of optical ports and optical ports of the second plurality of optical ports are configured both to transmit and receive optical signals.

8. The optical switch of claim 7, wherein the optical power detectors are located at the optical ports of the first plurality of optical ports and the second plurality of optical ports and configured to measure optical power in at least one of the following directions:
the transmit direction; and
the receive direction.

9. The optical switch of claim 7, wherein two optical power detectors are located at each of the optical ports of the first plurality of optical ports and of the second plurality of optical ports, one of the two optical power detectors configured to measure optical power in the transmit direction and one of the two optical power detectors configured to measure optical power in the receive direction.

10. The optical switch of claim 9, wherein the controller is further configured to compare detected optical power between an optical port of the first plurality of optical ports and an optical port of the second plurality to which it is coupled via the switching matrix; and
wherein the controller is further configured to report any difference in detected optical power exceeding a threshold level to a network administrator via a network control plane.

11. The optical switch of claim 1, wherein the controller is further configured to report any optical power detectors' detecting optical power below the threshold level to a network administrator via a network control plane.

* * * * *